Patented Jan. 30, 1951

2,539,909

UNITED STATES PATENT OFFICE 2,539,909

INSECTICIDAL COMPOSITION COMPRISING THE REACTION PRODUCT OF ETHYLENE CHLOROHYDRIN AND 4 - VINYL - CYCLOHEXENE

Herbert L. Johnson, Media, and Archibald P. Stuart, Norwood, Pa., assignors to Sun Oil Company, Philadelphia, Pa., a corporation of New Jersey No Drawing. Application October 24, 1947, Serial No. 782,020

3 Claims. (Cl. 167—30)

This invention relates to a chloroether product derived from 4-vinylcyclohexene by causing 4-vinylcyclohexene to interact with ethylene chlorohydrin at an elevated temperature in the presence of an acid-acting catalyst and to its preparation. The nature of the reaction product and the details of its preparation are more fully set out hereinbelow.

We have found that 4-vinylcyclohexene will form an ether product when it is caused to interact with ethylene chlorohydrin in the presence of an acid-acting catalyst at an elevated temperature.

Thus, according to the invention there is provided a novel product, and a process for its preparation, from 4-vinylcyclohexene by causing 4-vinylcyclohexene to interact with ethylene chlorohydrin in presence of an acid-acting catalyst at elevated temperature.

The following examples serve to illustrate the invention:

Example I

Anhydrous ethylene chlorohydrin (2.0 mols 161 g.) was heated to 100° C. and 3 ml. of conc. $H_2SO_4$ added. One mol (130 ml. 108 g.) of 4-vinylcyclohexene was now added over a period of one hour and the reaction mixture heated at 100° C. for four additional hours. The mixture was now cooled to room temperature and sufficient NaOH added to neutralize the sulfuric acid. The mixture was diluted with benzene and refluxed under a Dean-Stark type water trap until dry. The mixture was cooled, filtered from $Na_2SO_4$, and distilled. There was obtained 160.3 g. of a mixture of vinylcyclohexene and ethylene chlorohydrin, estimated from its refractive index to contain 73.4 g. of vinylcyclohexene; 33.9 g. of the vinylcyclohexene β-chloroethyl ether, B. P. 45–100° (3mm. Hg); 46.1 g. of a higher cut, B. P. 110–185° (3 mm. Hg); and 17.2 g. of a dark soft polymeric residue.

When redistilled, the ether boils at 90–92° (3 mm. Hg) $n_D^{20}$ 1.4756.

Anal.: Calculated for $C_{10}H_{17}OCl$, Cl, 18.79%; found, Cl, 18.41%.

Example II

The procedure of Example I was followed, except that 0.2 mol (28.4 g.) of boron trifluoride-ethyl ether complex was used as a catalyst rather than sulfuric acid. The reaction was carried out at 75° C. for five hours and yielded on distillation 69.5 g. of a mixture of ethylene chlorohydrin and 4-vinylcyclohexene, 34.1 g. of the desired beta-chloroether, corresponding to a yield of 18%, 18.5 g. of a higher boiling product and 16.5 g. residue.

The proportions of the reactants 4-vinylcyclohexene and ethylene chlorohydrin can be within the range of 0.5 mole to 5.0 moles of ethylene chlorohydrin to one mole of 4-vinylcyclohexene.

The temperature during the reaction can vary in the range 50° C.–150° C.

Other acid-acting catalysts than those mentioned in the examples can be used. Thus, stannic chloride or boron trifluoride can be used.

The product of this invention also has use as a plasticizer, softener and as a chemical intermediate for further synthesis.

We have also found that the chloroethyl ether product of 4-vinylcyclohexene possesses insecticidal activity against the common house fly. Thus, when a 5% solution of the product in "Deobase," a deodorized kerosene, was tested by the Standard Peet Grady method the following results were obtained.

|  | Sample | Official Test Insecticide |
|---|---|---|
| Kill 24 Hours | 33.1 | 51.2 |
| Knockdown in 10 Minutes | 37.2 | 94.3 |

Thus, according to the invention there is provided a novel insecticide composition having as at least one of its essential active ingredients the aforesaid chloroether product. According to the invention the chloroether product is admixed with a carrier which can be that above-mentioned or any of the other carriers, whether solids, liquids, emulsions or gases, which are well known in the art.

We claim:

1. A novel insecticidal composition of matter comprising a minor portion of the beta-chloroethyl ether reaction product obtained upon causing from 0.5 to 5 moles of ethylene chlorohydrin to interact with one mole of 4-vinylcyclohexene at a temperature of from 50° C. to 150° C. in the presence of an acid-acting catalyst, and a major portion of kerosene.

2. The composition according to claim 1 wherein the acid-acting catalyst is sulfuric acid.

3. The composition according to claim 1 wherein the acid-acting catalyst is boron trifluoride-ethyl ether complex.

HERBERT L. JOHNSON.
ARCHIBALD P. STUART.

REFERENCES CITED

The following references are of record in the file of this patent:

UNITED STATES PATENTS

| Number | Name | Date |
|---|---|---|
| 2,251,214 | Sheffield | July 29, 1941 |
| 2,309,017 | Schantz | Jan. 19, 1943 |
| 2,411,516 | Bruson | Nov. 26, 1946 |
| 2,417,455 | Cox | Mar. 18, 1947 |
| 2,421,597 | Bruson | June 3, 1947 |